(12) United States Patent
Bhide et al.

(10) Patent No.: US 9,403,999 B2
(45) Date of Patent: Aug. 2, 2016

(54) OXAZOLINE COMPOUNDS AS OPEN-TIME EXTENDERS FOR LATEX PAINTS

(71) Applicant: ANGUS Chemical Company, Buffalo Grove, IL (US)

(72) Inventors: Shreyas Bhide, Mumbai (IN); Asghar A. Peera, Cary, IL (US)

(73) Assignee: ANGUS CHEMICAL COMPANY, Buffalo Grove, IL (US)

( * ) Notice: Subject to any disclaimer, the term of this patent is extended or adjusted under 35 U.S.C. 154(b) by 0 days.

(21) Appl. No.: 14/671,005

(22) Filed: Mar. 27, 2015

(65) Prior Publication Data

US 2015/0274993 A1    Oct. 1, 2015

(30) Foreign Application Priority Data

Apr. 1, 2014 (IN) .............................. 951/DEL/2014

(51) Int. Cl.
  *C09D 7/12*  (2006.01)
  *C09D 5/14*  (2006.01)
  *C09D 5/02*  (2006.01)
  *C08K 5/353* (2006.01)

(52) U.S. Cl.
  CPC .............. *C09D 7/1233* (2013.01); *C09D 5/024* (2013.01); *C09D 5/14* (2013.01); *C08K 5/353* (2013.01)

(58) Field of Classification Search
  None
  See application file for complete search history.

(56) References Cited

U.S. PATENT DOCUMENTS

| | | | | |
|---|---|---|---|---|
| 2,932,580 A * | 4/1960 | Clark et al. | ................ | 106/501.1 |
| 3,025,252 A * | 3/1962 | Jack | .............................. | 523/200 |
| 4,055,433 A * | 10/1977 | Morones | ......................... | 106/10 |
| 4,391,932 A * | 7/1983 | Tai | ................................. | 523/337 |
| 4,536,300 A * | 8/1985 | Kayser et al. | .................. | 507/243 |
| 4,758,374 A * | 7/1988 | Durr et al. | ......................... | 516/58 |
| 5,270,380 A * | 12/1993 | Adamson et al. | ............. | 524/556 |
| 5,407,500 A * | 4/1995 | Forsberg et al. | .................. | 149/2 |
| 5,518,517 A * | 5/1996 | Jahnke et al. | ................. | 71/64.08 |
| 5,684,093 A * | 11/1997 | Tack et al. | ..................... | 525/374 |
| 5,827,809 A * | 10/1998 | Mainz et al. | .................. | 510/365 |
| 6,245,839 B1 * | 6/2001 | Jolley et al. | ...................... | 524/86 |
| 6,391,380 B1 * | 5/2002 | Goldberg | ....................... | 427/180 |
| 2003/0113623 A1* | 6/2003 | Ndzebet | ........................ | 429/212 |
| 2012/0165428 A1 | 6/2012 | Tilara et al. | | |

OTHER PUBLICATIONS

International Search Report and Written Opinion for PCT/US2015/023062, mailed Jun. 18, 2015.

Macosko C.W. et al., "Reactions at polymer-polymer interfaces for blend compatibilization", Progress in Polymer Science, vol. 30, No. 8-9, pp. 939-947, Jul. 20, 2005.

\* cited by examiner

*Primary Examiner* — Peter A Salamon

(74) *Attorney, Agent, or Firm* — Foley & Lardner LLP

(57) ABSTRACT

An aqueous coating composition containing a compound of formula (I)

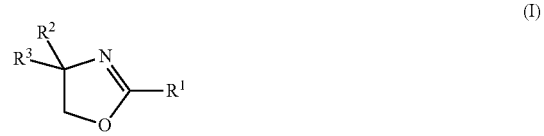

(I)

wherein $R^1$ is a $C_2$-$C_{20}$ hydrocarbyl group; and $R^2$ and $R^3$ independently are $C_1$-$C_{10}$ alkyl or $HO(CH_2CH_2O)_xCH_2$—, wherein x represents an integer from 0-5.

19 Claims, No Drawings

OXAZOLINE COMPOUNDS AS OPEN-TIME EXTENDERS FOR LATEX PAINTS

CROSS REFERENCE TO RELATED APPLICATIONS

This application claims priority to Indian Application 951/DEL/2014, filed Apr. 1, 2014, which is incorporated herein by reference.

BACKGROUND

This invention relates to an aqueous coating composition comprising oxazoline compounds.

U.S. Pub. No. 2012/0165428 discloses use of acrylic polymers containing polymerized hydrophilic monomer units as open-time extenders for latex paints. However, this reference does not disclose the compounds described in the present application or their use in latex paints as open-time extenders.

SUMMARY OF THE INVENTION

An aqueous coating composition comprising a compound of formula (I)

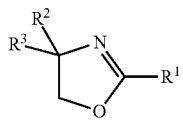

wherein $R^1$ is a $C_2$-$C_{20}$ aliphatic hydrocarbyl group; and $R^2$ and $R^3$ independently are $C_1$-$C_{10}$ alkyl or $HO(CH_2CH_2O)_xCH_2$—, wherein x represents an integer from 0-5.

DETAILED DESCRIPTION

All temperatures are in ° C. and all percentages are weight percentages (wt %), unless specified otherwise. All operations are carried out at room temperature (20-25° C.) and normal atmospheric pressure (ca. 101 kPa) unless specified otherwise.

A hydrocarbyl group is a substituent group derived by removing a hydrogen atom from a hydrocarbon. Preferably a hydrocarbyl group is acyclic. Examples of aliphatic hydrocarbyl groups include alkyl, alkenyl and alkynyl groups, where the alkenyl and alkynyl groups may have more than one carbon-carbon multiple bond. Acyclic aliphatic hydrocarbyl groups may be straight or branched.

Preferably, $R^1$ is a $C_5$-$C_{20}$ aliphatic hydrocarbyl group, preferably $C_7$-$C_{20}$, preferably $C_9$-$C_{19}$, preferably $C_{11}$-$C_{19}$, preferably $C_{11}$-$C_{17}$, preferably $C_{13}$-$C_{17}$, preferably $C_{15}$-$C_{17}$. Preferably, $R^1$ is alkyl or alkenyl, preferably alkenyl. Preferably, $R^1$ is a $C_7$-$C_{20}$ alkenyl group, preferably $C_9$-$C_{19}$, preferably $C_{11}$-$C_{17}$, preferably $C_{13}$-$C_{17}$, preferably $C_{15}$-$C_{17}$.

Preferably, when $R^1$ is alkenyl it has one to three carbon-carbon double bonds, preferably one or two, preferably one; preferably the double bonds are in the cis configuration. Preferably, $R^2$ and $R^3$ independently are $C_1$-$C_6$ alkyl or $HO(CH_2CH_2O)_xCH_2$—, preferably $C_1$-$C_4$ alkyl or $HO(CH_2CH_2O)_xCH_2$—, preferably $C_1$-$C_2$ alkyl, or $HO(CH_2CH_2O)_xCH_2$—. Preferably, x is an integer from 0 to 4, preferably from 0 to 3, preferably from 0 to 2, preferably 0 or 1. Preferably $R^2$ and $R^3$ are both hydroxymethyl (HO(CH$_2$CH$_2$O)$_x$CH$_2$—, with x=0). Preferably $R^2$ and $R^3$ are both methyl or ethyl, preferably methyl. Preferably $R^2$ is hydroxymethyl and $R^3$ is methyl or ethyl. Preferably $R^2$ and $R^3$ are both $HO(CH_2CH_2O)_xCH_2$—, preferably with x from 0 to 4, preferably from 0 to 3, preferably from 0 to 2, preferably 0 or 1.

Especially preferred compounds of formula (I) include, e.g., the following

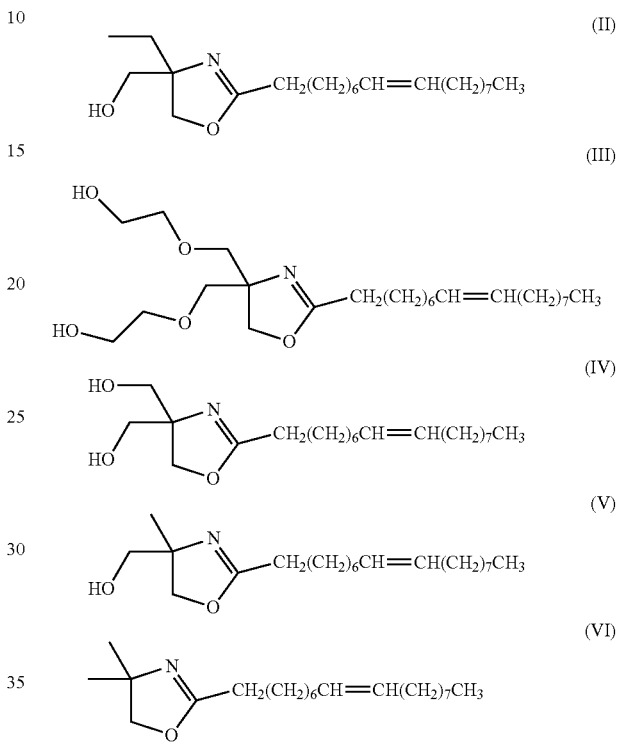

In the formulas shown above the indicated carbon-carbon double bond has the cis (Z) configuration.

Preferably, the 1-octanol/water partition coefficient, log $P_{oct/wat}$ (Moriguchi model), of the compound is from 1 to 5; preferably at least 1.5, preferably at least 2; preferably no more than 4.5, preferably no more than 4.3. The compound of formula (II) has log ($P_{oct/wat}$) of 4.15, the compound of formula (III) has log ($P_{oct/wat}$) of 2.4, the compound of formula (IV) has log($P_{oct/wat}$) of 3.13, the compound of formula (V) has log($P_{oct/wat}$) of 3.93 and the compound of formula (VI) has log($P_{oct/wat}$) of 4.77.

Preferably, the aqueous coating composition is a latex paint. Preferably, the latex paint comprises an acrylic binder (acrylic emulsion polymer), titanium dioxide and/or other pigments/opacifiers and other typical ingredients of a latex paint, e.g., biocide, low-VOC solvent, defoamer, wetting agent and thickener. Preferably, the aqueous coating composition comprises from 30 to 60 wt % water (preferably 36 to 52 wt %), from 15 to 40 wt % acrylic binder on a solids basis (preferably 18 to 32 wt %) and from 15 to 35 wt % opacifying minerals (e.g., titanium dioxide, calcium carbonate) (preferably 18 to 32 wt %). Preferably, the pH of the aqueous coating composition is from 7 to 10, preferably from 8 to 9.5.

Preferably, the compound of formula (I) is present in the aqueous coating composition in an amount from 0.1 to 10 wt %, based on the weight of the entire composition; preferably at least 0.3 wt %, preferably at least 0.5 wt %, preferably at least 0.7 wt %; preferably no more than 7 wt %, preferably no more than 5 wt %, preferably no more than 4 wt %, preferably no more than 3 wt %, preferably no more than 2.5 wt %, preferably no more than 2 wt %, preferably no more than 1.5 wt %. More than one compound of formula (I) may be present in the aqueous coating composition. Amounts of the compound of formula (I) apply to the total of all compounds of formula (I).

The present invention is also directed to a method for increasing the open time of an aqueous coating composition (preferably a latex paint) by adding to the composition at least one compound of formula (I) in the amounts described herein. The compounds may be added to the initial acrylic polymer dispersion or to the final formulated coating composition containing pigments and other ingredients. The compounds may be added in combination with other organic or inorganic bases, e.g., sodium hydroxide, amines, etc. The compounds may be dispersed in solvents or carriers, including, e.g., oil, water, glycols, surfactants. It is believed that many of the compounds described herein will have the additional advantage of being low-VOC additives, especially compounds which are hydroxy substituted and/or which have longer hydrocarbon substituents. Many of these compounds could further impart other properties in the paint such as Freeze-Thaw, neutralization and biocidal efficacy.

EXAMPLES

Example 1

Paint Formulation: Paint samples based on the following paint formulations are used

| Ingredient | Paint Sample A (% by wt) | Paint Sample B (% by wt) | Paint Sample C (% by wt) |
|---|---|---|---|
| Water | 3.00 | 3.00 | 3.00 |
| TRITON CF 10 wetting agent | 0.30 | 0.30 | 0.30 |
| BYK 024 defoamer | 0.05 | 0.05 | 0.05 |
| OROTAN 731 dispersant | 1.00 | 1.00 | 1.00 |
| KATHON LXE biocide | 0.20 | 0.20 | 0.20 |
| ROCIMA 350 biocide | 0.35 | 0.35 | 0.35 |
| Catcite 2 microns | 5.00 | 5.00 | 5.00 |
| TIONA 595 TiO$_2$ | 20.00 | 20.00 | 20.00 |
| Water | 3.50 | 3.50 | 3.50 |
| TEXANOL coalescent | 2.5 | 2.5 | 2.5 |
| ALKATERGE ™ E additive | 0.0 | 1.0 | 0.0 |
| ALKATERGE ™ T-IV additive | 0.0 | 0.0 | 1.0 |
| NOPCO NDW defoamer | 0.20 | 0.20 | 0.20 |
| PRIMAL HG-91 acrylic binder | 40.00 | 40.00 | 40.00 |
| ROPAQUE ULTRA E acrylic binder | 8.00 | 8.00 | 8.00 |
| TT-935 high shear rheology modifier | 0.20 | 0.20 | 0.20 |
| RM2020 low shear rheology modifier | 2.50 | 2.50 | 2.50 |
| Water | 13.2 | 12.2 | 12.2 |
| Total | 100 | 100 | 100 |
| pH | 8.9 | 8.9 | 8.9 |

The schematic of the structure of ALKATERGE™ E is as follows,

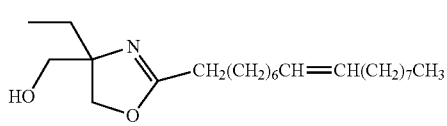

The schematic of the structure of ALKATERGE™ T-IV is as follows,

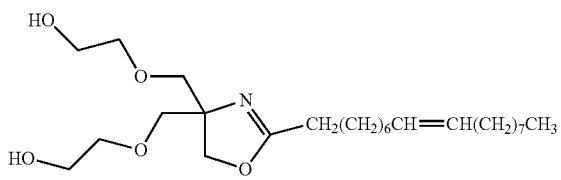

1. Paint drawdowns of 75 μm thickness are 5 done on a glass sheet.
2. Equispaced "X" marks are drawn on the drawdown.
3. Paint is applied perpendicular to the drawdown, brushing the "X" mark across the initial drawdown.
4. Perpendicular sections are repeated at 5, 6, 7, 8, 9, 10, 11 and 12 minutes after the making of the "X" marks.
5. Open time of the paint is taken to be the time elapsed when the "X" marks become visible.

Paint Properties:

Paint properties such as the opacity and the color difference are measured for the paint samples. Drawdown of the paint samples is carried out using BYK Gardener applicator of 75 micrometer thickness. The opacity and color differences are measured using spectrophotometer of the make Gregtag Macbeth Color-Eye 2180. The color difference is calculated as, $$\Delta E = \sqrt{(\Delta L)^2 + (\Delta a)^2 + (\Delta b)^2}$$

Here, ΔL, Δa and Δb are the differences between the CIE color space L, a, b values of the paint sample and the reference. Paint sample A is treated as the reference. Drawdowns of 100 micrometer thickness were carried out and the scrub resistance was measured in terms of the percentage loss after 800 scrub cycles.

Results: The table below lists the time elapsed when the X marks become visible for the different paint samples.

| Paint Sample | Time (minutes) |
|---|---|
| A (no additive) | 7 |
| B (ALKATERGE ™ E) | 10 |
| C (ALKATERGE ™ T-IV) | 9 |

Opacity and the Color Difference:

| | Paint Sample A (Reference) | Paint Sample B | Paint Sample C |
|---|---|---|---|
| Opacity (%) | 94.44 | 94.88 | 94.92 |
| ΔL | 0 | 0.38 | 0.52 |
| Δa | 0 | 0.05 | 0.03 |
| Δb | 0 | −0.19 | −0.28 |
| ΔE | 0 | 0.43 | 0.59 |

Scrub Resistance:

| Paint Sample | % Loss after 800 cycles |
|---|---|
| A (no additive) | 3 |
| B (ALKATERGE ™ E) | 2.5 |
| C (ALKATERGE ™ T-IV) | 2 |

Conclusion: Open time of the paint samples B and C which contain at 1.0 wt % of ALKATERGE™ E and ALKATERGE™ T-IV, respectively, is more than that of the reference paint (sample A) by up to 45% (3 minutes). The other paint properties measured in this work showed equivalent performance.

What is claimed is:

1. An aqueous coating composition comprising
0.1-10 wt %, based on the weight of the entire composition, of a compound of formula (I)

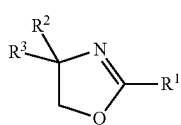

wherein $R^1$ is a $C_2$-$C_{20}$ hydrocarbyl group; and $R^2$ and $R^3$ independently are $C_1$-$C_{10}$ alkyl or $HO(CH_2CH_2O)_x CH_2$, wherein x represents an integer from 0-5;
30 to 60 wt % water;
15 to 40 wt % acrylic binder on a solids basis; and
15 to 35 wt % opacifying minerals,
wherein the aqueous coating composition is a latex paint.

2. The aqueous coating composition of claim 1 in which $R^1$ is a $C_7$-$C_{20}$ aliphatic hydrocarbyl group.

3. The aqueous coating composition of claim 1 in which $R^2$ and $R^3$ independently are $C_1$-$C_6$ alkyl or $HO(CH_2CH_2O)_x CH_2$, wherein x represents an integer from 0-5.

4. The aqueous coating composition of claim 1 in which x is from 0 to 3.

5. The aqueous coating composition of claim 1 in which $R^1$ is an alkyl or alkenyl group.

6. The aqueous coating composition of claim 1 in which $R^1$ is a $C_{15}$-$C_{17}$ alkyl or alkenyl group.

7. The aqueous coating composition of claim 1 in which x is 0 or 1.

8. The aqueous coating composition of claim 1 in which the composition has a pH from 7 to 10.

9. The aqueous coating composition of claim 1 in which the compound of formula (I) is present in the aqueous coating composition in an amount from 0.1 to 5 wt %, based on the weight of the entire composition.

10. The aqueous coating composition of claim 1 in which $R^1$ is a $C_{11}$-$C_{19}$ aliphatic hydrocarbyl group.

11. The aqueous coating composition of claim 1 in which $R^1$ is a $C_{11}$-$C_{17}$ alkyl or alkenyl group.

12. The aqueous coating composition of claim 11 in which the alkenyl group comprises one to three carbon-carbon double bonds.

13. The aqueous coating composition of claim 11 in which the alkenyl group comprises cis carbon-carbon double bonds.

14. The aqueous coating composition of claim 1 in which $R^2$ and $R^3$ independently are $C_1$-$C_2$ alkyl or $HO(CH_2CH_2O)_x CH_2$, wherein x represents an integer from 0-5.

15. The aqueous coating composition of claim 1 in which x is 0.

16. The aqueous coating composition of claim 1 in which the compound of formula (I) is selected from the group consisting of

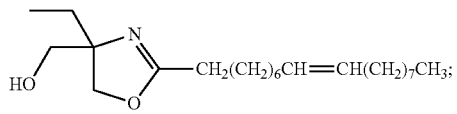

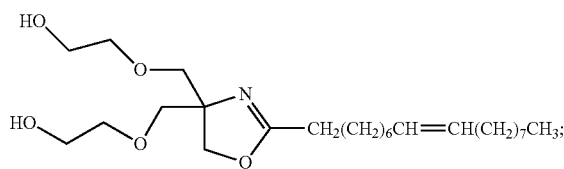

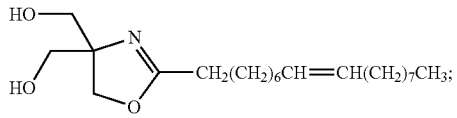

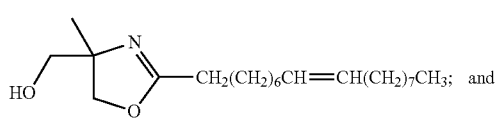

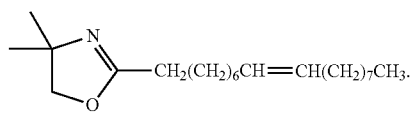

17. The aqueous coating composition of claim 1 in which the composition comprises two or more compounds of formula (I).

18. The aqueous coating composition of claim 1 comprising 18-32 wt % opacifying minerals.

19. The aqueous coating composition of claim 1 wherein the opacifying minerals comprise titanium dioxide.

* * * * *